(12) United States Patent
Kulshreshtha

(10) Patent No.: US 10,346,373 B1
(45) Date of Patent: Jul. 9, 2019

(54) MERGING AND VENDING PARTIAL DATABASE SCHEMAS

(71) Applicant: Amazon Technologies, Inc., Seattle, WA (US)

(72) Inventor: Rohit Kulshreshtha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 15/270,685

(22) Filed: Sep. 20, 2016

(51) Int. Cl.
*G06F 16/21* (2019.01)
*G06F 16/23* (2019.01)
*G06F 16/215* (2019.01)

(52) U.S. Cl.
CPC .......... *G06F 16/212* (2019.01); *G06F 16/214* (2019.01); *G06F 16/215* (2019.01); *G06F 16/23* (2019.01)

(58) Field of Classification Search
CPC ...... G06F 16/212; G06F 16/23; G06F 16/214; G06F 16/215
See application file for complete search history.

(56) References Cited

U.S. PATENT DOCUMENTS

| | | | | |
|---|---|---|---|---|
| 7,599,947 | B1 * | 10/2009 | Tolbert | G06F 16/86 |
| | | | | 707/999.104 |
| 8,768,959 | B1 * | 7/2014 | Annapragada | G06F 17/30545 |
| | | | | 707/770 |
| 2004/0225952 | A1 * | 11/2004 | Brown | G06F 8/20 |
| | | | | 714/819 |
| 2005/0120029 | A1 * | 6/2005 | Tomic | G06F 16/86 |
| | | | | 707/999.1 |
| 2006/0277224 | A1 * | 12/2006 | Aftab | G06F 17/30575 |
| 2007/0226203 | A1 * | 9/2007 | Adya | G06F 16/2445 |
| | | | | 707/999.004 |
| 2008/0228697 | A1 * | 9/2008 | Adya | G06F 16/27 |
| | | | | 707/999.002 |

* cited by examiner

*Primary Examiner* — Shahid A Alam
(74) *Attorney, Agent, or Firm* — Lee & Hayes, P.C.

(57) ABSTRACT

Technologies are disclosed for merging and vending partial database schemas. A schema compiler exposes a network services application programming interface (API) for merging partial database schemas for a database. Prior to merging partial database schemas, the schema compiler can determine whether namespace conflicts exist between the partial database schemas. If no namespace conflicts exist between the partial database schemas, the schema compiler can merge the partial database schemas to create a merged database schema. The merged database schema can then be provided to a database service that provides the database. The API can also include methods for retrieving partial database schemas from the merged database schema, updating or replacing database schemas in the merged database schema, and deleting partial database schemas from the merged database schema.

20 Claims, 9 Drawing Sheets

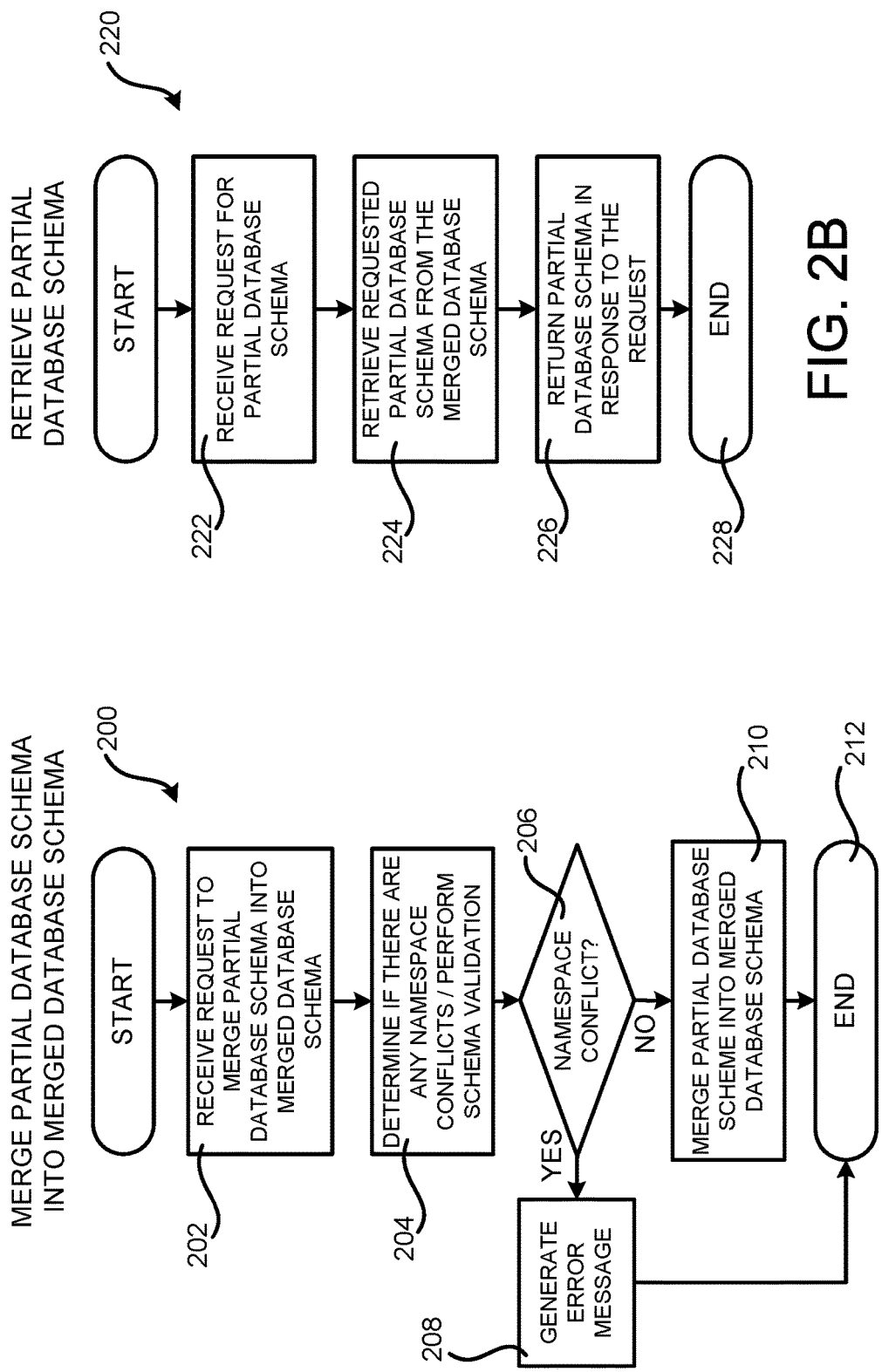

MERGING AND VENDING PARTIAL DATABASE SCHEMAS

BACKGROUND

Database schemas are metadata that define a structure for data stored in a database. In essence, database schemas are a contract between client applications and a database system. In many cases, the client systems that utilize such databases are not monolithic. Rather, they are built by composing together libraries and other types of components. Often, however, these components are not created by the developer of the client application. Consequently, if the components require database access, they typically provide an abstract interface to access the database. Clients then implement these interfaces to provide the components access to the database. Shared components can also be built as separate services that operate outside the process space of the client application.

There are, however, limitations to both of the models described above. For example, if database access is abstracted out, then a component cannot efficiently provide a prescription for the internal layout of the database. A designer of a shared component would like to do this to ensure that data in the database is laid out in a way that provides efficient data access to the shared component. From the perspective of the client, however, the shared component is a black box and, therefore, the client might not be the best party to suggest a data layout on behalf of the designer of the shared component.

When the component is built as a network service, the modifications to the database by both the client application and shared component cannot be done in the same transaction. One remedy for this shortcoming is to build a distributed transaction protocol implementation. Such an implementation is, however, costly to operate and maintain, and can hit scaling limits quickly.

The disclosure made herein is presented with respect to these and other considerations.

BRIEF DESCRIPTION OF THE DRAWINGS

FIGS. 2A-2D are flow diagrams showing routines that illustrate aspects of the operation of a network services application programming interface exposed by the schema compiler shown in FIG. 1, according to one particular configuration;

DETAILED DESCRIPTION

Figure 1:
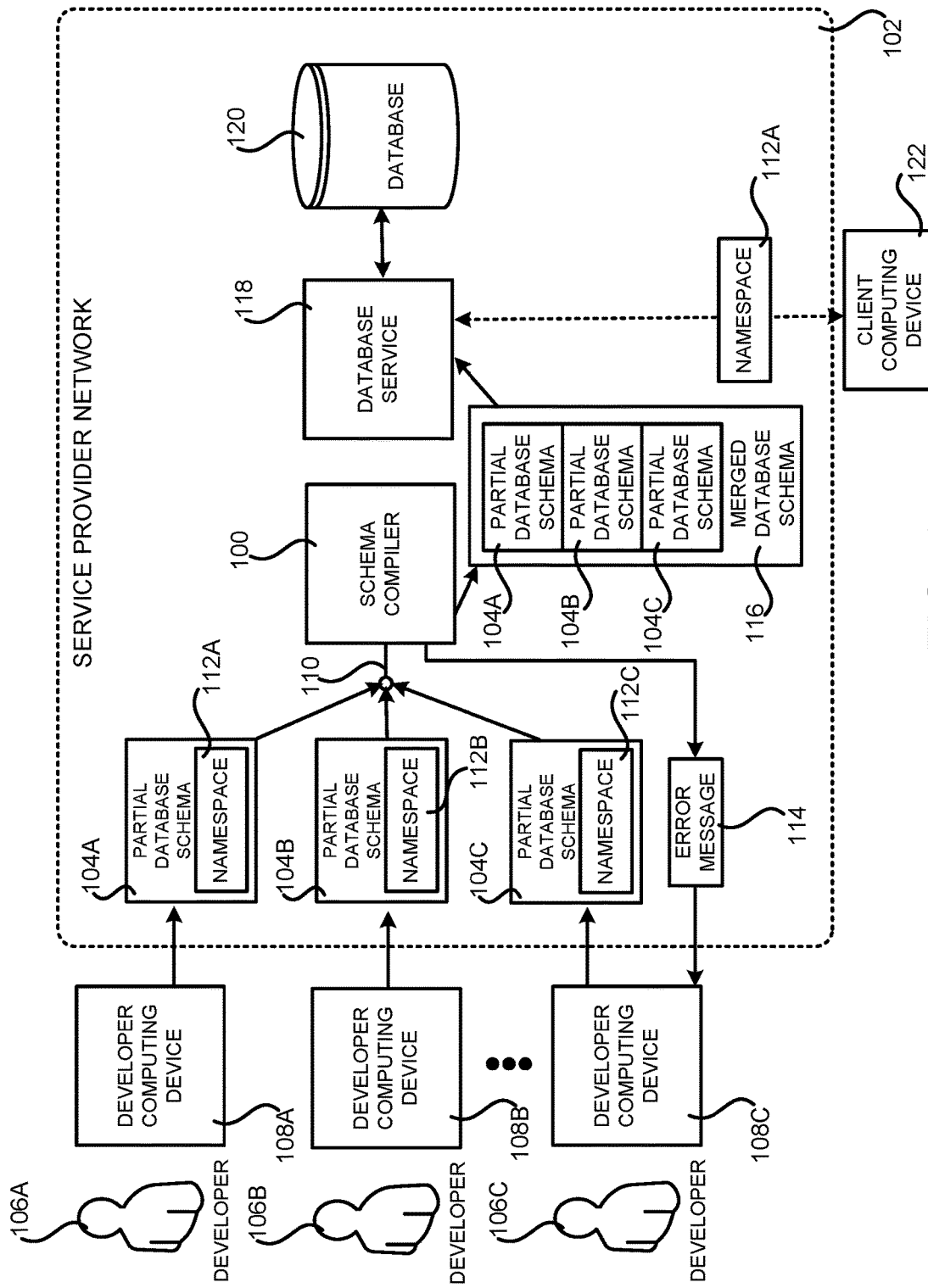
FIG. 1 is a software and network architecture diagram showing aspects of the operation of a schema compiler configured to provide functionality for merging and vending partial database schemas, according to one particular configuration.

The following detailed description is directed to technologies for merging and vending partial database schema. Through an implementation of the disclosed technologies, different parties can contribute partial schemas to a monolithic database schema. This allows experts in one domain to provide functionality to other domains without losing the technical benefits of shared transactions and efficient data access. Technical benefits other than those specifically mentioned herein can also be realized through an implementation of the disclosed technologies.

In order to enable the functionality disclosed herein, a schema compiler exposes a network services application programming interface ("API") for merging partial database schemas for a database. Prior to merging partial database schemas, the schema compiler can determine whether namespace conflicts exist between the partial database schemas. If no namespace conflicts exist between the partial database schemas, the schema compiler can merge the partial database schemas to create a merged database schema. The merged database schema can then be provided to a database service for use during client access to the database.

The API can also include methods for retrieving partial database schemas from the merged database schema, updating or replacing database schemas in the merged database schema, and deleting partial database schemas from the merged database schema. Additional details regarding the various components and processes described briefly above for merging and vending partial database schemas will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization of a mechanism for merging and vending partial database schemas, according to one particular configuration. As discussed briefly above, the service provider network 102 (which might be referred to herein as the "SPN 102") is a computing network configured to provide computing resources (which might be referred to simply as "resources") on a permanent or an as-needed basis. Among other types of functionality, the computing resources provided by the service provider network 102 can be utilized to implement various types of network services. The computing resources provided by the service provider network 102 can include data processing resources like VM instances, data storage resources, networking resources, data communication resources, network services, and other types of computing resources.

A user of the service provider network 102, such as the software developers 106A-106C, can utilize an appropriate computing system, such as the developer computing devices 108A-108C, respectively, to communicate with the service provider network 102 over an appropriate data communications network (not shown in FIG. 1). In this way, a user of the service provider network 102 can configure various aspects of the operation of the computing resources provided by the service provider network 102, or to otherwise control any computing resources being utilized by the user.

For example, and without limitation, a computing system utilized by a user of the service provider network 102 can be utilized to purchase computing resources in the service provider network 102, to configure aspects of the operation of the computing resource, to access and utilize functionality provided by the various services and systems described herein, and/or to perform other types of functionality with regard to the operation of the computing resources provided by the service provider network 102.

The computing device (e.g. the developer computing devices 108A-108C) utilized to configure and monitor the resources in the service provider network 102 can be any type of computing device capable of connecting to the service provider network 102 via a suitable data communications network such as, but not limited to, a laptop or desktop computer, a tablet computing device, a server computer, or a smartphone.

Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 4-7.

As discussed briefly above, the service provider network 102 can also be configured to execute various types of network services. For example, and without limitation, the service provider network 102 can execute a schema compiler 100, a database service 118, and other network services, some of which are described in greater detail below.

Each of the network services can provide different types of computing resources 110 and/or functionality. For instance, an on-demand computing service (not shown in FIG. 1) can provide VM instances, a storage service (also not shown in FIG. 1) can provide storage volumes, and the database service 118 can provide databases, such as the database 120. Other network services can provide other types of computing resources. In this regard, it should be appreciated that the network services and the respective computing resources that each provides are merely illustrative and that other types of network services can provide other types of computing resources and functionality in other configurations.

As mentioned briefly above, a schema compiler 100 can be executed in the service provider network 102. The schema compiler 100 can be provided as a standalone network service, as a service operated in conjunction with the database service 118, or integrated with the database service 118 itself. As also discussed briefly above, the schema compiler 100 provides functionality for merging and vending partial database schemas 104. The partial database schemas 102 represent a portion of a database schema for a database 120 provided by the database service 118.

The partial database schemas 102 can include metadata that defines a structure for a portion of the data stored in the database 120. For example, and without limitation, the partial database schemas 104 can include metadata defining a partial physical database schema and a partial logical database schema. The partial physical database schema relates to the actual storage of data in the database 120, and its form of storage such as files, indices, etc. The partial physical database schema defines how the data in the database 120 will be stored in secondary storage. The partial logical database schema defines the logical constraints that need to be applied on the data stored in the database. It can, for example, define tables and views of the data stored in the database 120. The partial database schemas 104 can be defined using the structured query language ("SQL") or any other language suitable for defining a database schema.

In order to provide the functionality disclosed herein for merging and vending partial database schemas 104, the schema compiler also exposes a network services API 110 in one configuration. As will be described in greater detail below, the network services API 110 includes a method for merging partial database schemas 104 to create a merged database schema 116, a method for retrieving a partial database schema 104 from the merged database schema 116, a method for deleting a partial database schema 104 from the merged database schema 116, a method for updating (i.e. making changes to) a partial database schema 104 in the merged database schema 116, and a method for replacing a partial database schema 104 in the merged database schema 116 with another partial database schema 104. The API 110 can expose other methods in other configurations.

In the scenario illustrated in FIG. 1, a software developer 106A has utilized the developer computing device 108A to call a method exposed by the API 110 for merging partial database schemas 104. As a part of the request to the API 110, a partial database schema 104A has been provided. As also illustrated in FIG. 1, the partial database schema 104A has an associated namespace 112A. The namespace 112A uniquely identifies the partial database schema 104A. In response to receiving the call to the method exposed by the API 110 for merging the partial database schema 104A, the schema compiler 110 merges the partial database schema 104A into the merged database schema 116.

In the scenario illustrated in FIG. 1, another software developer, the software developer 106B, has utilized the developer computing device 108B to also call the method exposed by the API 110 for merging partial database schemas 104. As a part of this request to the API 110, a partial database schema 104B has also been provided. As also illustrated in FIG. 1, the partial database schema 104B has an associated namespace 112B that uniquely identifies the partial database schema 104B. In response to receiving the call to the method exposed by the API 110 for merging the partial database schema 104B, the schema compiler 110 merges the partial database schema 104B into the merged database schema 116, along with other partial database schemas 104 already contained therein.

In the scenario illustrated in FIG. 1, a third software developer, the software developer 106C, has utilized the developer computing device 108C to also call the method exposed by the API 110 for merging partial database schemas 104. As a part of this request to the API 110, a partial database schema 104C has also been provided. As also illustrated in FIG. 1, the partial database schema 104C has an associated namespace 112C that uniquely identifies the partial database schema 104C. In response to receiving the call to the method exposed by the API 110 for merging the partial database schema 104C, the schema compiler 110 merges the partial database schema 104C into the merged database schema 116, along with other partial database schemas 104 already contained therein. Consequently, following the operations described above, the merged database schema 116 includes the partial database schema 104A, the partial database schema 104B, and the partial database schema 104C. Other partial database schemas 104 can be merged into the merged database schema 116 in a similar manner.

In one configuration, the schema compiler is configured to identify potential conflicts between the partial database schemas 104 prior to merging a partial database schema 104 into the merged database schema 116. For example, and without limitation, the schema complier 100 can determine whether a namespace 112 associated with a partial database schema 112 is the same as another namespace 112 associated with another partial database schema 112 already present in the merged database schema 116. If a conflict exists, the schema compiler 100 will not merge the new partial database schema 104 into the merged database schema 116. The schema compiler 100 can also transmit an error message 114 to the computing device that requested the merger that indicates that a namespace conflict exists.

The schema compiler 100 can also identify other types of conflicts and/or errors can in other configurations. For example, and without limitation, the schema compiler 100 can perform schema validation on the partial database schema 112 to be merged. In this way, the schema compiler 100 can determine whether the partial database schema 112 is valid in view of the contents of the database 120 with which it is to be utilized.

As also illustrated in FIG. 1, the schema compiler 100 can make the merged database schema 116 available to the database service 118. The database service 118, in turn, can utilize the merged database schema 116 when processing request to access or modify the database 120. For example, and without limitation, a client of the database service 118, such as the client computing device 122, can make a connection to the database 120. The client computing device 122 can access the database 120 utilizing the complete merged database schema 116.

The client computing device 122 can also optionally specify one or more namespaces 112 to the database service 118. In the example, shown in FIG. 1, for instance, the client computing device 122 has specified the namespace 112A to the database service 118. Based upon this indication, the database service 118 can restrict future requests made by the client computing device 122 to the partial database schemas 104 associated with the specified namespace 112. In the example shown in FIG. 1, for instance, the database service 118 will restrict operations performed by the client computing device 122 to the partial database schema 104A.

In this manner, the client computing device 122 only needs to specify the appropriate namespace 112 one time and the database service 118 will subsequently utilize the partial database schema 104 associated with the specified namespace 112 for performing operations on behalf of the client computing device 122. Other client computing devices 122 can specify namespaces 112 in a similar fashion. Additional details regarding the operation of the schema compiler 100 and the network services API 110 that it exposes will be provided below with regard to FIGS. 2A-3.

FIGS. 2A-2D are flow diagrams showing routines 200, 220, 240, and 260, respectively, that illustrate aspects of the operation of a network services API 110 exposed by the schema compiler 100 shown in FIG. 1, according to one particular configuration. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 shown in FIG. 2A illustrates aspects of the operation of the schema compiler 100 for merging a partial database schema 104 into the merged database schema 116. The routine 200 begins at operation 202, where the schema compiler 100 receives a request via the API 110 to merge a partial database schema 104 into the merged database schema 116. In response to receiving such a request, the routine 200 proceeds to operation 204, where the schema compiler 100 determines whether the namespace 112 associated with the partial database schema 104 to be merged into the merged database schema 116 conflicts (i.e. is the same as) with the namespace 112 of another partial database schema 104 already contained in the merged database schema 116. The schema compiler 100 can also perform schema validation on the partial database schema 104 to ensure that the partial database schema 104 is compatible with the database 120.

If the schema compiler 100 detects a namespace conflict, the routine 200 proceeds from operation 206 to operation 208, where an error message 114 can be transmitted to the computing device 108 that requested the merge. If no namespace conflicts exist (and if the partial database schema 104 can be validated), the routine 200 proceeds from operation 206 to operation 210, where the schema compiler 100 merges the partial database schema 104 provided with the request into the merged database schema 116. The merged database schema 116 can then be provided to the database service 118 for use in processing requests to access or modify the database 120 from client computing devices. From operation 210, the routine 200 proceeds to operation 212, where it ends.

The routine 220 shown in FIG. 2B illustrates aspects of the operation of the schema compiler 100 for retrieving a partial database schema 104 from the merged database schema 116. The routine 220 begins at operation 222, where the schema compiler 100 receives a request via the API 110 to retrieve a partial database schema 104 from the merged database schema 116. In response to receiving such a request, the routine 220 proceeds to operation 224, where the schema compiler 100 retrieves the requested partial database schema 104 from the merged database schema 116. The routine 220 then proceeds to operation 226, where the retrieved partial database schema 104 is returned in response to the request. The routine 220 then proceeds from operation 226 to operation 228, where it ends.

Figure 2C:
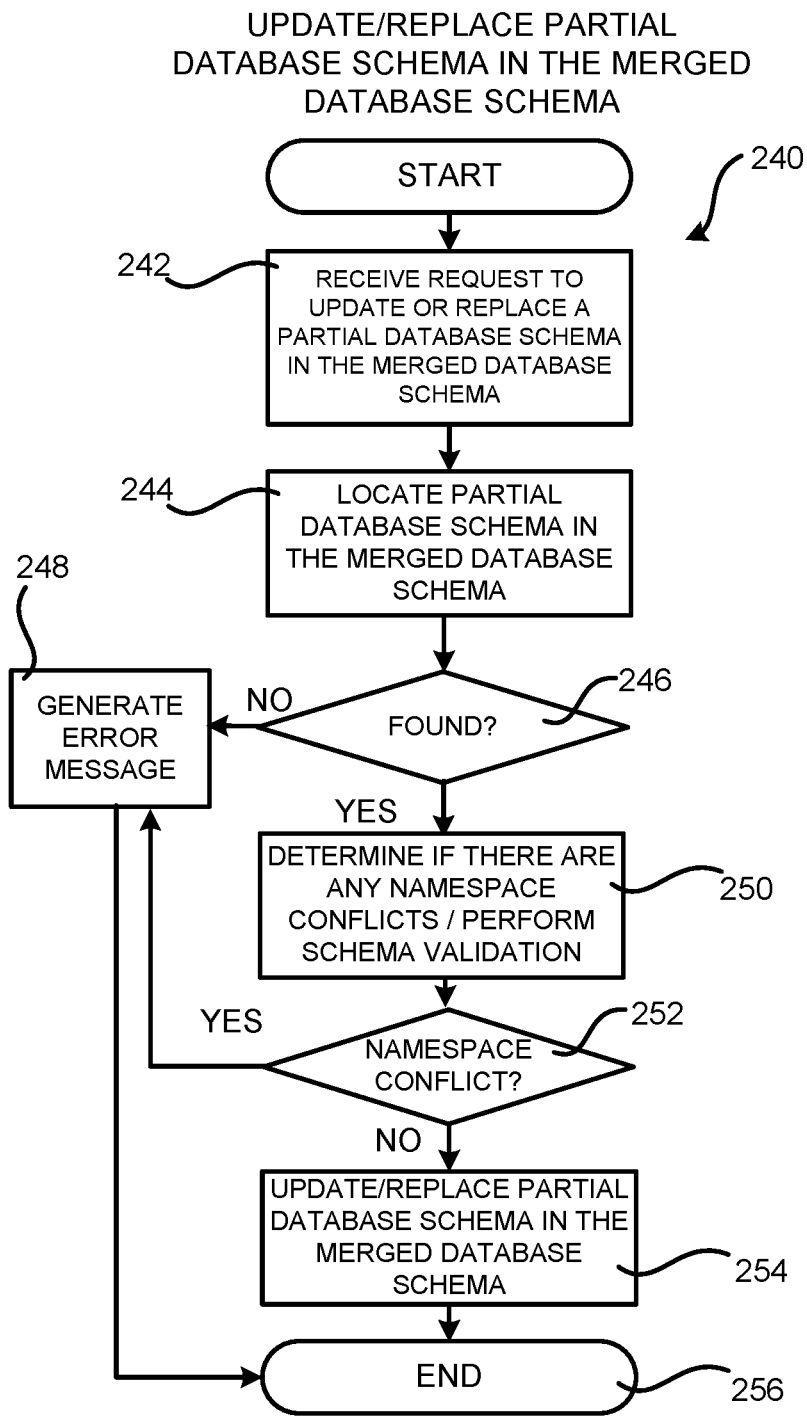

The routine 240 shown in FIG. 2C illustrates aspects of the operation of the schema compiler 100 for updating or replacing a partial database schema 104 in the merged database schema 116. The routine 240 begins at operation 242, where the schema compiler 100 receives a request via the API 110 to update or replace a partial database schema 104 in the merged database schema 116. In response to receiving such a request, the routine 240 proceeds to operation 224, where the schema compiler 100 attempts to locate the partial database schema 104 that is to be replaced or updated in the merged database schema 116. If the partial database schema 104 that is to be replaced or updated cannot be found in the merged database schema 116, the routine 240 proceeds to operation 248 where an error message 114 can be provided to the requestor of the update or replace operation.

If the partial database schema 104 that is to be replaced or updated is found in the merged database schema 116, the routine 240 proceeds from operation 246 to operation 250, where the schema computer 100 can determine if there are any namespace conflicts between the partial database schema 104 that is to be merged into the merge database schema 116 or the updated partial database schema 104. The schema compiler 100 can also perform schema validation on the partial database schema 104 that is to be merged into the merge database schema 116 or the updated partial database schema 104.

If there are any namespace conflicts or schema validation errors, the routine 240 proceeds to operation 248, where an error message can be generated. If, however, there are no namespace conflicts or schema validation errors, the routine 240 proceeds from operation 252 to operation 254. At operation 254, the identified partial database schema 104 is updated or replaced with another partial database schema 104. The routine 240 then proceeds to operation 256, where it ends.

Figure 2D:
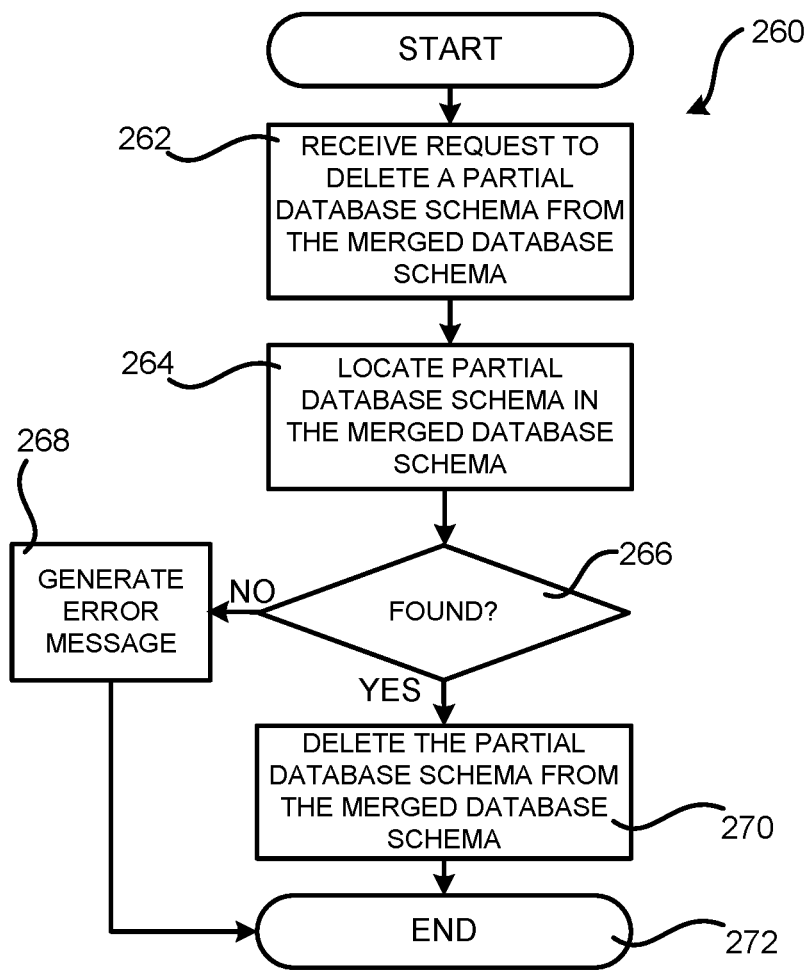

The routine 260 shown in FIG. 2D illustrates aspects of the operation of the schema compiler 100 for deleting a partial database schema 104 from the merged database schema 116. The routine 260 begins at operation 262, where the schema compiler 100 receives a request via the API 110 to delete a partial database schema 104 from the merged database schema 116. In response to receiving such a request, the routine 260 proceeds to operation 264, where the schema compiler 100 attempts to locate the partial database schema 104 that is to be deleted from the merged database schema 116. If the partial database schema 104 that is to be deleted cannot be found in the merged database schema 116, the routine 260 proceeds to operation 268 where an error message 114 can be provided to the requestor of the delete operation.

If the partial database schema 104 that is to be deleted is found in the merged database schema 116, the routine 260 proceeds from operation 266 to operation 270, where the identified partial database schema 104 is deleted from the merged database schema 270. The routine 260 then proceeds to operation 272, where it ends.

Figure 3:
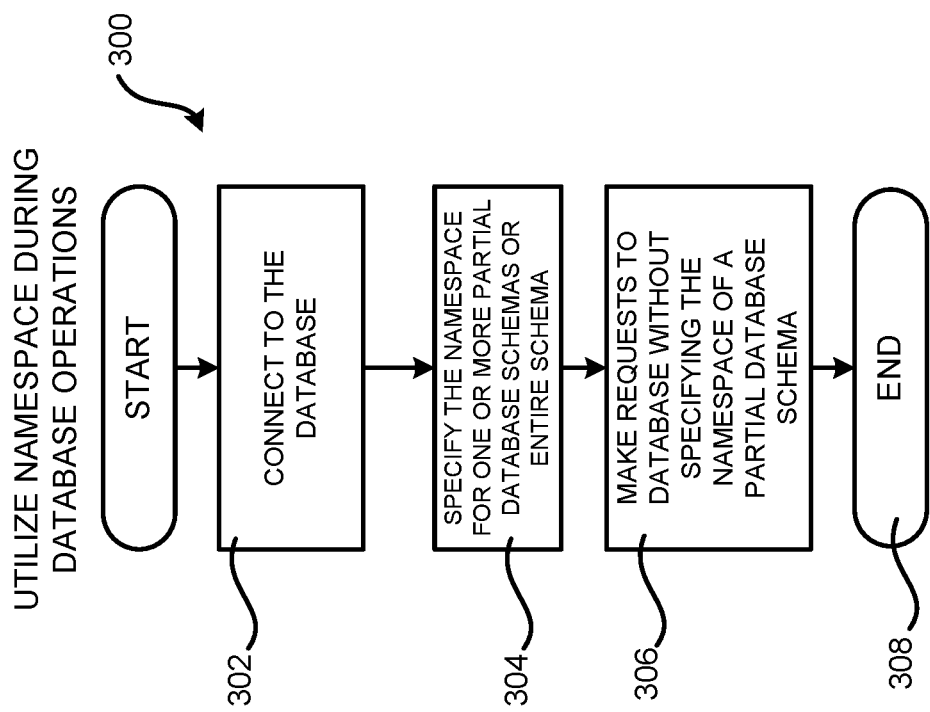
FIG. 3 is a flow diagram showing a routine that illustrate aspects of the operation of a client computing device for accessing a database through a database service configured to utilize a database schema generated by the schema compiler shown in FIG. 1, according to one particular configuration.

FIG. 3 is a flow diagram showing a routine 300 that illustrate aspects of the operation of a client computing device 122 for accessing a database 120 through a database service 118 configured to utilize a database schema 116 generated by the schema compiler 100 shown in FIG. 1, according to one particular configuration. The routine 300 begins at operation 302, where a client computing device 122 makes a connection to the database 120 using the database service 118.

The routine 300 then proceeds to operation 304, where the client computing device 122 optionally specifies one or more namespaces 112 for a partial database schema 104. The client computing device 122 can also specify that the entire merged database schema 116 is to be utilized.

The routine 300 then proceeds from operation 304 to operation 306, where the client computing device 122 can subsequently make requests to the database 120 without specifying a namespace 112 for a partial database schema 104. Rather, the database service 118 restricts requests made by the client computing device 122 to the partial database schema 104 associated with the namespace 112 specified at operation 304. In this manner, the client computing device 122 only needs to specify the appropriate namespace 112 one time, and the database service 118 will subsequently utilize the partial database schema 104 associated with the specified namespace 112 for performing operations on behalf of the client computing device 122. The routine 300 proceeds from operation 306 to operation 308, where it ends.

It is to be appreciated that while the disclosure made herein has been presented primarily in the context of partial database schemas, the technologies disclosed herein can also be utilized with other types of partial storage schemas. For example, and without limitation, the technologies disclosed herein can be utilized to merge partial storage schemas for datastores other than databases in a similar fashion. It is also to be appreciated that the functionality disclosed herein can be made available to developers in other ways including, but not limited to, through libraries.

Figure 4:
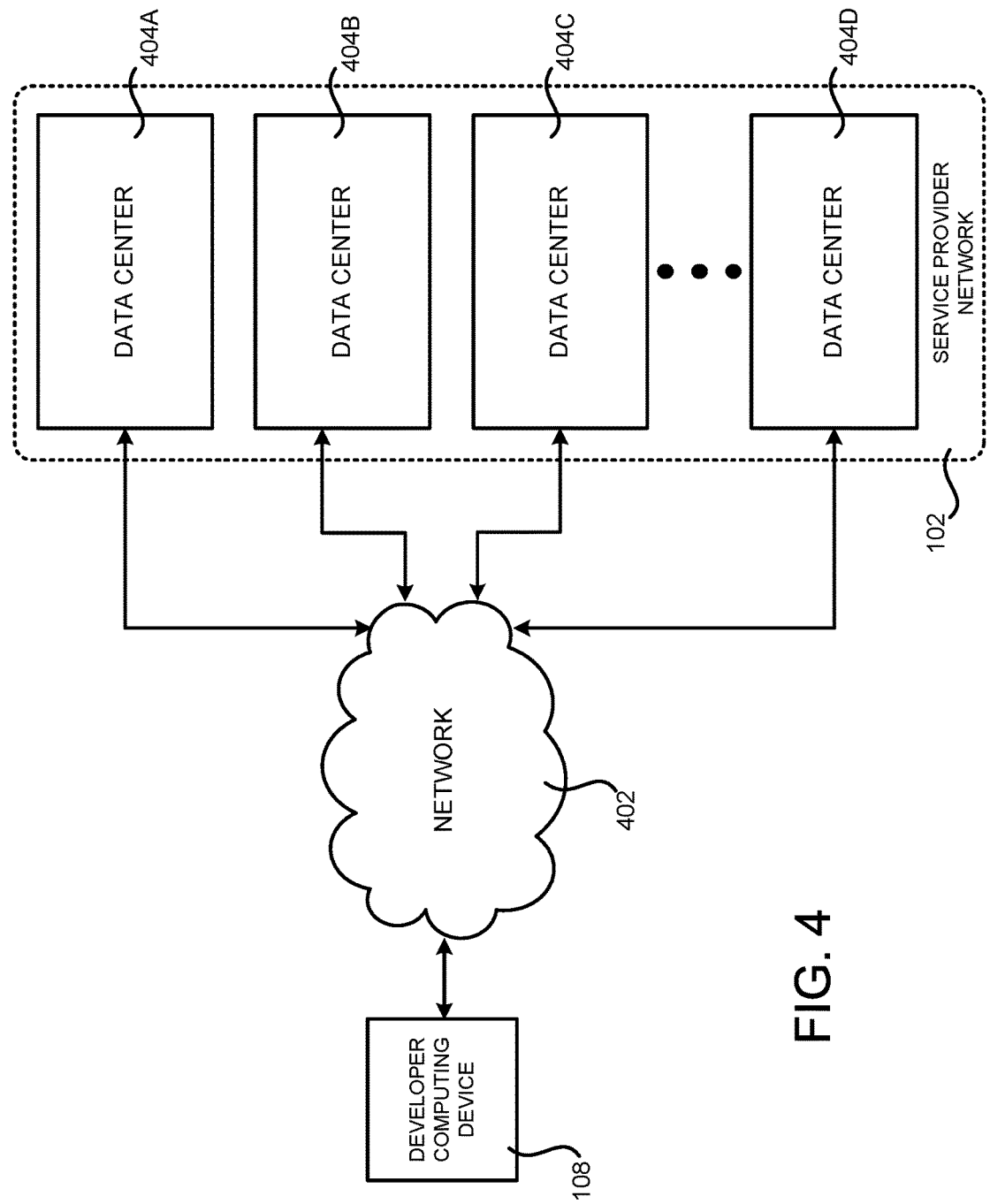
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 102 that can be configured to execute the schema compiler 100, the database service 118, and the other network services described above, according to one configuration disclosed herein. As discussed above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data processing resources, such as VM instances, data storage resources, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

As also discussed above, the computing resources provided by the service provider network 102 are enabled in one implementation by one or more data centers 404A-404D (which might be referred to herein singularly as "a data center 404" or collectively as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The customers and other users of the service provider network 102 can access the computing resources provided by the service provider network 102 over a network 402, which can be a wide area communication network ("WAN"), such as the Internet, an intranet or an Internet service provider ("ISP") network or a combination of such networks. For example, and without limitation, a computing device 108 operated by a developer or other user of the service provider network 102 can be utilized to access the service provider network 102 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
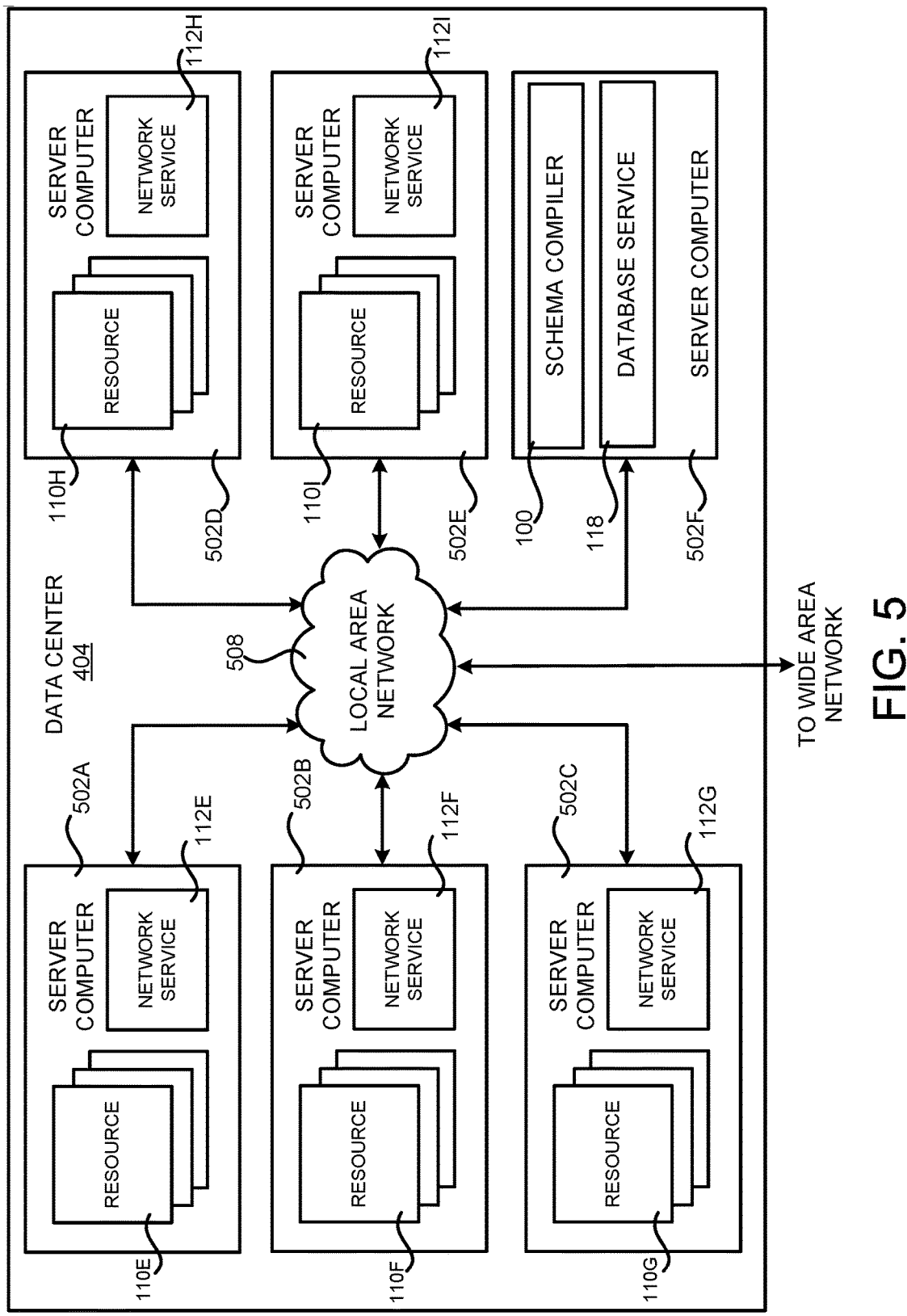
FIG. 5 is a computing system diagram illustrating a configuration for a data center that can be utilized to implement aspects of the technologies disclosed herein.

FIG. 5 is a computing system diagram that illustrates one configuration for a data center 404 that can be utilized to implement the schema compiler 100, the database service 118, and the other network services disclosed herein. The example data center 404 shown in FIG. 5 includes several server computers 502A-502E (which might be referred to herein singularly as "a server computer 502" or in the plural as "the server computers 502") for providing the computing resources 110A-110I.

The server computers 502 can be standard tower, rackmount, or blade server computers configured appropriately for providing the various computing resources described herein (illustrated in FIG. 5 as the computing resources 110E-110I). As mentioned above, the computing resources 110 provided by the service provider network 102 can be data processing resources such as VM instances or hardware computing systems, data storage resources, database resources, networking resources, and others. Some of the servers 502 can also be configured to execute network services capable of instantiating, providing and/or managing the computing resources 110, some of which are described in detail herein.

The data center 404 shown in FIG. 5 also includes a server computer 502F that can execute some or all of the software components described above. For example, and without limitation, the server computer 502F can be configured to execute the schema compiler 100 and the database service 118, both of which were described in detail above. The server computer 502F can also be configured to execute other components and/or to store data for providing some or all of the functionality described herein. In this regard, it should be appreciated that components or different instances of the schema compiler 100 and the database service 118 can execute on many other physical or virtual servers in the data centers 404 in various configurations.

In the example data center 404 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 404A-404D, between each of the server computers 502A-502F in each data center 404, and, potentially, between computing resources 110 in each of the data centers 404. It should be appreciated that the configuration of the data center 404 described with reference to FIG. 5 is merely illustrative and that other implementations can be utilized.

Figure 6:
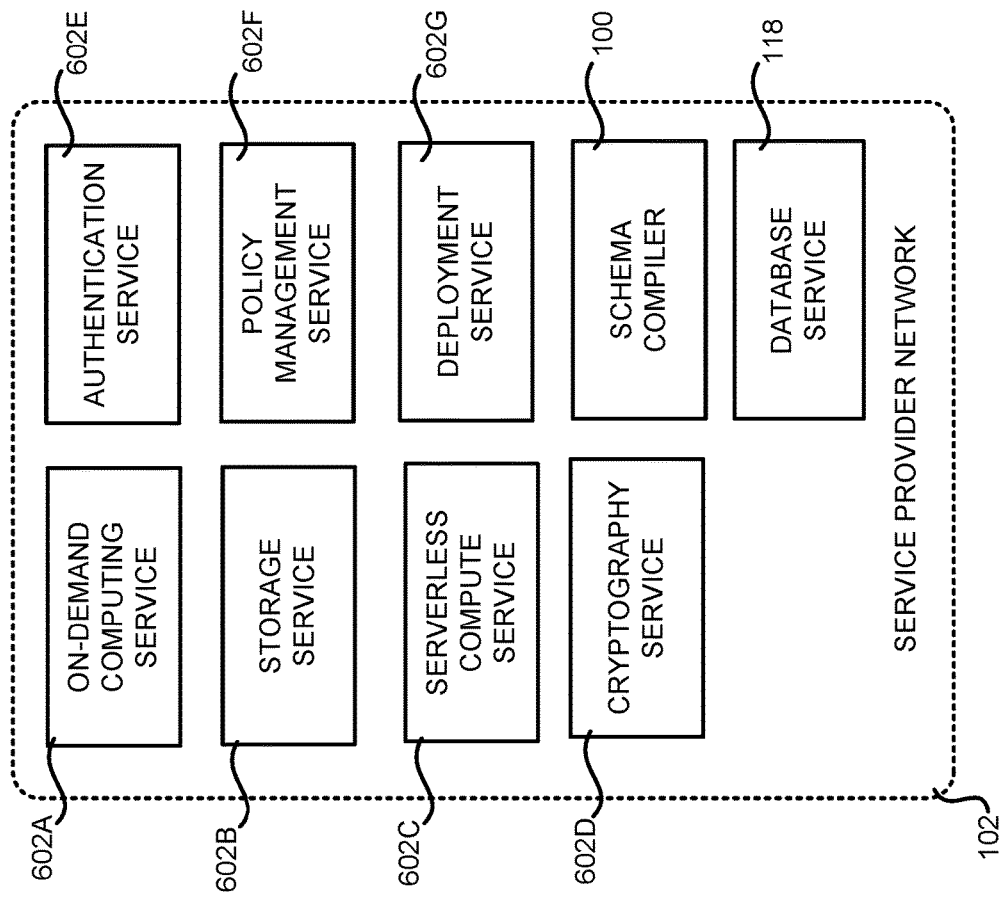
FIG. 6 is a network services diagram that shows aspects of several services that can be provided by and utilized within a service provider network configured to implement the various technologies disclosed herein.

FIG. 6 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, an on-demand computing service 602A, a storage service 602B, a serverless compute service 602C, a cryptography service 602D, an authentication service 602E, a policy management service 602F, and a deployment service 602G. The service provider network 102 can also provide the schema compiler 100 and the database service 118, both of which were described in detail above. The service provider network 102 can also provide other types of network services, some of which are described below.

It is to be appreciated that customers of the service provider network 102 can include organizations or individuals that utilize some or all of the network services provided by the service provider network 102. As described above, a customer or other user can communicate with the service provider network 102 using an appropriate computing device through a network, such as the network 402 shown in FIG. 4.

It is also noted that not all configurations described include the network services shown in FIG. 6 and that additional network services can be provided in addition to or as an alternative to the services explicitly described herein. Each of the services shown in FIG. 6 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other (e.g., to enable a VM provided by the on-demand computing service 602A to store data in or retrieve data from the storage service 602B). Additional details regarding some of the services shown in FIG. 6 will now be provided.

The on-demand computing service 602A can be a collection of computing resources configured to instantiate VM instances and to provide other types of computing resources 110 on demand. For example, a customer or other user of the service provider network 102 can interact with the on-demand computing service 602A (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the customer.

Other applications for the VM instances can be to support database applications, electronic commerce applications, business applications and/or other applications. Although the on-demand computing service 602A is shown in FIG. 6, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The storage service 602B can include software and computing resources that collectively operate to store data using block or file-level storage devices (and/or virtualizations thereof). The storage devices of the storage service 602B can, for example, be operationally attached to virtual computer systems provided by the on-demand computing service 602A to serve as logical units (e.g., virtual drives) for the computer systems. A storage device can also enable the persistent storage of data used/generated by a corresponding virtual computer system where the virtual computer system service can only provide ephemeral data storage.

The serverless compute service 602C is a network service that allows users to execute code (which might be referred to herein as a "function") without provisioning or managing server computers in the service provider network 102. Rather, the serverless compute service 602C can automatically run code in response to the occurrence of events. The code that is executed can be stored by the storage service 602B or in another network accessible location. In this regard, it is to be appreciated that the term "serverless compute service" as used herein is not intended to infer that servers are not utilized to execute the program code, but rather that the serverless compute service 602C enables users to execute code without provisioning or managing server computers. The serverless compute service 602C executes program code only when needed, and only utilizes the resources necessary to execute the code. In some configurations, the user or entity executing the code might be charged only for the amount of time required for each execution of their program code.

The service provider network 102 can also include a cryptography service 602D. The cryptography service 602D can utilize storage services of the service provider network 102, such as the storage service 602B, to store encryption keys in encrypted form, whereby the keys can be usable to decrypt customer keys accessible only to particular devices of the cryptography service 602D. The cryptography service 602D can also provide other types of functionality not specifically mentioned herein.

As illustrated in FIG. 6 and discussed above, the service provider network 102, in various configurations, also includes an authentication service 602E and a policy management service 602F. The authentication service 602E, in one example, is a computer system (i.e., collection of computing resources 110) configured to perform operations involved in authentication of users. For instance, one of the services shown in FIG. 6 can provide information from a user to the authentication service 602E to receive information in return that indicates whether or not the requests submitted by the user are authentic.

The policy management service 602F, in one example, is a network service configured to manage policies on behalf of customers or internal users of the service provider network 102. The policy management service 602F can include an interface that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 602G for deploying program code in some configurations. The deployment service 602G provides functionality for deploying program code, such as to virtual or physical hosts provided by the on-demand computing service 602A.

As also discussed briefly above, the database service 118 can be a collection of computing resources that collectively operate to create, maintain, and allow queries to be performed on databases stored within the service provider network 102. For example, a customer or other user 106 of the service provider network 102 can operate and manage a database 120 provided by the database service 118 by utilizing appropriately configured network API calls.

Other services include the schema compiler 100, which was described in detail above. The service provider network 102 can also include object-level archival data storage services, and services that manage, monitor, interact with, or support other services. The service provider network 102 can also be configured with other network services not specifically mentioned herein in other configurations.

Figure 7:
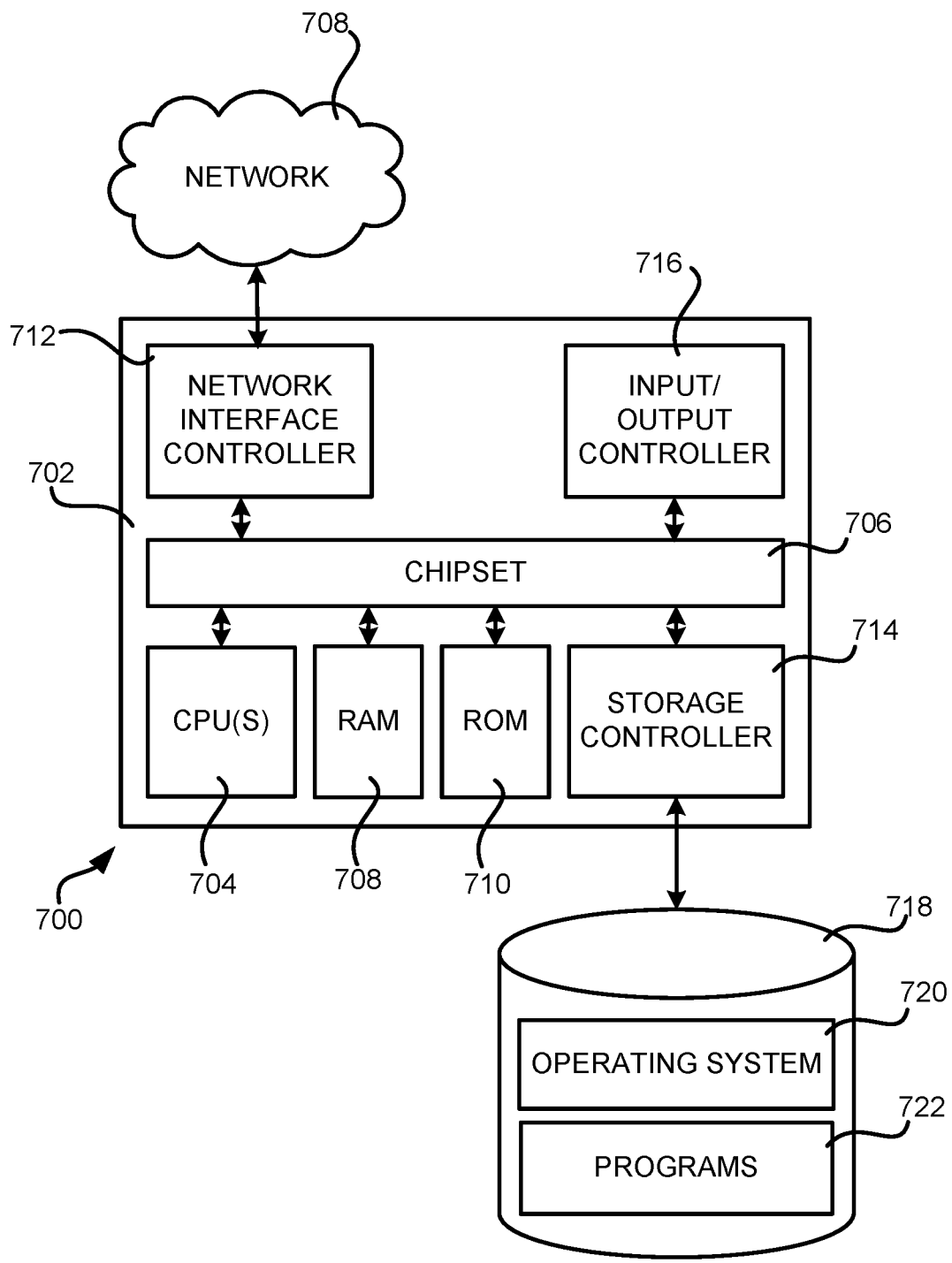
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system or one of its variants such as, but not limited to, UBUNTU, DEBIAN, and CENTOS. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-3. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or can utilize an architecture completely different than that shown in FIG. 7.

Based on the foregoing, it should be appreciated that technologies for merging and vending partial database schemas have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
a processor; and
a non-transitory computer-readable storage medium having instructions stored thereupon which, when executed by the processor, cause the apparatus to:
expose a network services application programming interface (API) in a service provider network;
receive, by way of the network services API, a request to merge a first partial database schema for a database with at least one other partial database schema for the database, each of the partial database schemas having an associated namespace;
execute a schema compiler within the service provider network;
determine, by the schema compiler, that a namespace associated with the first partial database schema does not conflict with a namespace associated with the at least one other partial database schema;
merge the first partial database schema and the at least one other partial database schema by the schema compiler, to create a merged database schema in response to determining that the namespace associated with the first partial database schema does not conflict with the namespace associated with the at least one other partial database schema, wherein the merged database schema is a monolithic database schema for the database; and
provide the merged database schema to a database service operating in the service provider network that provides the database to enable selective access to the first partial database schema and the at least one other partial database schema via the merged database schema.

2. The apparatus of claim 1, wherein the non-transitory computer-readable storage medium has further instructions stored thereupon to:
receive, by way of the network services API, a request to retrieve a second partial database schema from the merged database schema;
determine that the second partial database schema is present in the merged database schema; and
in response to determining that the second partial database schema is present in the merged database schema, retrieve the second partial database schema from the merged database schema and provide the second partial database schema in response to the request for the partial database schema.

3. The apparatus of claim 1, wherein the non-transitory computer-readable storage medium has further instructions stored thereupon to:
receive, by way of the network services API, a request to delete a third partial database schema from the merged database schema;
determine that the third partial database schema is present in the merged database schema; and
in response to determining that the third partial database schema is present in the merged database schema, delete the third partial database schema from the merged database schema.

4. The apparatus of claim 1, wherein the non-transitory computer-readable storage medium has further instructions stored thereupon to:
receive, by way of the network services API, a request to update a fourth partial database schema in the merged database schema;
determine that the fourth partial database schema is present in the merged database schema; and
in response to determining that the fourth partial database schema is present in the merged database schema, perform schema validation and namespace validation on the fourth partial database schema; and
update the fourth partial database schema in the merged database schema.

5. The apparatus of claim 1, wherein the non-transitory computer-readable storage medium has further instructions stored thereupon to:
receive, by way of the network services API, a request to replace to a fifth partial database schema in the merged database schema with a sixth partial database schema;
determine that the fifth partial database schema is present in the merged database schema;
in response to determining that the fifth partial database schema is present in the merged database schema, perform schema validation and namespace validation on the fifth partial database schema; and
replace the fifth partial database schema in the merged database schema with the sixth partial database schema.

6. The apparatus of claim 1, wherein the database service is configured to receive a namespace from a client device accessing the database, and to utilize the namespace first received from the client device to identify a merged database schema or a partial database schema in the merged database schema for use in responding to requests from the client device to access the database.

7. The apparatus of claim 6, wherein the database service is configured to utilize the partial database schema associated with the namespace first received from the client device in responding to subsequent requests from the client device to access the database.

8. A computer-implemented method, comprising:
receiving a request to merge a first partial database schema for a database with at least one other partial database schema for the database, each of the partial database schemas having an associated namespace;
executing a schema compiler within a service provider network;

determining, by the schema compiler, that a namespace associated with the first partial database schema does not conflict with a namespace associated with the at least one other partial database schema;

merging the first partial database schema and the at least one other partial database schema, by the schema compiler, to create a merged database schema in response to determining that the namespace associated with the first partial database schema does not conflict with the namespace associated with the at least one other partial database schema, wherein the merged database schema is a monolithic database schema for the database; and providing the merged database schema to a database service operating in the service provider network that provides the database to enable selective access to the first partial database schema and the at least one other partial database schema via the merged database schema.

9. The computer-implemented method of claim 8, further comprising:

exposing a network services application programming interface (API) in a service provider network, and wherein the request to merge the first partial database schema for the database with at least one other partial database schema for the database is received by way of the network services API.

10. The computer-implemented method of claim 9, further comprising:

receiving, by way of the network services API, a request to retrieve a second partial database schema from the merged database schema;

determining that the second partial database schema is present in the merged database schema; and in response to determining that the second partial database schema is present in the merged database schema, retrieving the second partial database schema from the merged database schema and provide the second partial database schema in response to the request for the partial database schema.

11. The computer-implemented method of claim 9, further comprising:

receiving, by way of the network services API, a request to delete a third partial database schema from the merged database schema;

determining that the third partial database schema is present in the merged database schema; and in response to determining that the third partial database schema is present in the merged database schema, deleting the third partial database schema from the merged database schema.

12. The computer-implemented method of claim 9, further comprising:

receiving, by way of the network services API, a request to update a fourth partial database schema in the merged database schema;

determining that the fourth partial database schema is present in the merged database schema;

in response to determining that the fourth partial database schema is present in the merged database schema, performing schema validation and namespace validation on the fourth partial database schema; and updating the fourth partial database schema in the merged database schema.

13. The computer-implemented method of claim 9, further comprising:

receiving, by way of the network services API, a request to replace to a fifth partial database schema in the merged database schema with a sixth partial database schema;

determining that the fifth partial database schema is present in the merged database schema; and in response to determining that the fifth partial database schema is present in the merged database schema, performing schema validation and namespace validation on the fifth partial database schema; and replacing the fifth partial database schema in the merged database schema with the sixth partial database schema.

14. A non-transitory computer-readable storage medium having instructions stored thereupon which are executable by a processor and which, when executed, cause the processor to:

receive a request to merge a first partial database schema for a database with at least one other partial database schema for the database, each of the partial database schemas having an associated namespace;

execute a schema compiler within a service provider network;

determine, by the schema compiler, that a namespace associated with the first partial database schema does not conflict with a namespace associated with the at least one other partial database schema;

merge the first partial database schema and the at least one other partial database schema, by the schema compiler, to create a merged database schema in response to determining that the namespace associated with the first partial database does not conflict with the namespace associated with the at least one other partial database schema, wherein the merged database schema is a monolithic database schema for the database; and provide the merged database schema to a database service operating in a service provider network that provides the database to enable selective access to the first partial database schema and the at least one other partial database schema via the merged database schema.

15. The non-transitory computer-readable storage medium of claim 14, having further instructions stored thereupon to expose a network services application programming interface (API) in the service provider network, and wherein the request to merge the first partial database schema for the database with at least one other partial database schema for the database is received by way of the network services API.

16. The non-transitory computer-readable storage medium of claim 15, having further instructions stored thereupon to:

receive, by way of the network services API, a request to retrieve a second partial database schema from the merged database schema;

determine that the second partial database schema is present in the merged database schema; and in response to determining that the second partial database schema is present in the merged database schema, retrieve the second partial database schema from the merged database schema and provide the second partial database schema in response to the request for the partial database schema.

17. The non-transitory computer-readable storage medium of claim 15, having further instructions stored thereupon to:

receive, by way of the network services API, a request to delete a third partial database schema from the merged database schema;
determine that the third partial database schema is present in the merged database schema; and
in response to determining that the third partial database schema is present in the merged database schema, delete the third partial database schema from the merged database schema.

18. The non-transitory computer-readable storage medium of claim 15, having further instructions stored thereupon to:
receive, by way of the network services API, a request to update a fourth partial database schema in the merged database schema;
determine that the fourth partial database schema is present in the merged database schema;
perform schema validation and namespace validation on the fourth partial database schema; and
in response to determining that the fourth partial database schema is present in the merged database schema, update the fourth partial database schema in the merged database schema.

19. The non-transitory computer-readable storage medium of claim 15, having further instructions stored thereupon to:
receive, by way of the network services API, a request to replace to a fifth partial database schema in the merged database schema with a sixth partial database schema;
determine that the fifth partial database schema is present in the merged database schema;
perform schema validation and namespace validation on the fourth partial database schema; and
in response to determining that the fifth partial database schema is present in the merged database schema, replace the fifth partial database schema in the merged database schema with the sixth partial database schema.

20. The non-transitory computer-readable storage medium of claim 14, having further instructions stored thereupon to perform schema validation on the first partial database schema.

* * * * *